(12) United States Patent
Duncum et al.

(10) Patent No.: US 7,854,277 B2
(45) Date of Patent: Dec. 21, 2010

(54) WELLBORE FLUID COMPRISING A BASE FLUID AND A PARTICULATE BRIDGING AGENT

(75) Inventors: Simon Neil Duncum, Bracknell (GB); Christopher Alan Sawdon, Par (GB)

(73) Assignee: BP Exploration Operating Company Limited, Middlesex (GB)

( * ) Notice: Subject to any disclaimer, the term of this patent is extended or adjusted under 35 U.S.C. 154(b) by 154 days.

(21) Appl. No.: 12/223,391

(22) PCT Filed: Jan. 10, 2007

(86) PCT No.: PCT/GB2007/000055
§ 371 (c)(1), (2), (4) Date: Jul. 30, 2008

(87) PCT Pub. No.: WO2007/088322
PCT Pub. Date: Aug. 9, 2007

(65) Prior Publication Data
US 2009/0008095 A1 Jan. 8, 2009

(30) Foreign Application Priority Data
Jan. 31, 2006 (GB) .................................. 0601961.6

(51) Int. Cl.
| C09K 8/03 | (2006.01) |
| C09K 8/502 | (2006.01) |
| C09K 8/504 | (2006.01) |
| C09K 8/506 | (2006.01) |
| E21B 21/00 | (2006.01) |
| E21B 33/138 | (2006.01) |
| E21B 43/25 | (2006.01) |

(52) U.S. Cl. .................. 175/72; 166/292; 166/294; 166/300; 175/65; 507/130; 507/140; 507/142; 507/243; 507/269; 507/274

(58) Field of Classification Search .................. None
See application file for complete search history.

(56) References Cited

U.S. PATENT DOCUMENTS

| 3,374,835 A | * | 3/1968 | Knox .................. 166/282 |
| 3,785,438 A | | 1/1974 | Jackson et al. |
| 4,369,843 A | | 1/1983 | Mondshine |
| 4,619,776 A | * | 10/1986 | Mondshine .................. 507/211 |
| 4,620,596 A | * | 11/1986 | Mondshine .................. 166/292 |
| 5,314,022 A | * | 5/1994 | Cowan et al. .................. 166/293 |
| 5,337,824 A | | 8/1994 | Cowan et al. |
| 5,553,670 A | * | 9/1996 | Cowan .................. 166/293 |
| 6,422,314 B1 | | 7/2002 | Todd et al. |
| 6,837,309 B2 | | 1/2005 | Boney et al. |
| 7,211,546 B2 | * | 5/2007 | Dobson et al. .................. 507/110 |
| 2004/0173353 A1 | | 9/2004 | Todd |
| 2005/0003966 A1 | * | 1/2005 | Dobson et al. .................. 507/100 |
| 2005/0059556 A1 | | 3/2005 | Munoz, Jr. et al. |
| 2006/0009364 A1 | | 1/2006 | Dobson |
| 2009/0029878 A1 | * | 1/2009 | Bicerano .................. 507/107 |
| 2009/0197781 A1 | * | 8/2009 | Sunkara .................. 507/221 |

FOREIGN PATENT DOCUMENTS

| EP | 0 845 520 | 6/1998 |
| EP | 1 041 174 | 10/2000 |
| EP | 1 074 598 | 2/2001 |
| WO | 94/09254 | 4/1994 |
| WO | 2005/061652 | 7/2005 |
| WO | 2006/054058 | 5/2006 |

OTHER PUBLICATIONS

International Search Report for PCT/GB2007/000055 mailed.
Written Opinion for PCT/GB2007/000055 mailed.
International Preliminary Report on Patentability for PCT/GB2007/000055 mailed.

* cited by examiner

Primary Examiner—George Suchfield
(74) Attorney, Agent, or Firm—Nixon & Vanderhye

(57) ABSTRACT

Wellbore fluid containing a base fluid and a particulate bridging agent comprised of melamine. A method is also described of forming a removable filter cake on the walls of a wellbore that penetrates a porous and permeable rock formation by placing in the wellbore a wellbore fluid containing a base fluid and melamine, and permitting the melamine to deposit from the wellbore fluid onto or into the walls of the wellbore to form the filter cake, whereby fluid loss to the formation through the removable filter cake is reduced.

17 Claims, No Drawings

WELLBORE FLUID COMPRISING A BASE FLUID AND A PARTICULATE BRIDGING AGENT

This application is the U.S. national phase of International Application No. PCT/GB2007/000055 filed 10 Jan. 2007 which designated the U.S. and claims priority to British Patent Application No. 0601961.6 filed 31 Jan. 2006, the entire contents of each of which are hereby incorporated by reference.

The present invention relates to wellbore fluids utilized in the construction, repair or treatment of a wellbore and to the removal of filter cake deposited by the wellbore fluids on or in rock formations penetrated by the wellbore.

Wellbore fluids include drilling fluids, lost circulation fluids, completion fluids (such as perforating pills and under-reaming fluids), and servicing fluids (such as workover fluids, milling fluids, fracturing fluids, solvents, aqueous fluids containing non-acidic dissolving agents, and fluids containing particulate diverting agents).

Drilling fluids are utilized when drilling a wellbore through a porous and permeable rock formation, for example, a hydrocarbon-bearing rock formation. It is highly desirable that the drilling fluid minimizes damage to the permeability of the rock formation. For example, damage to the permeability of a hydrocarbon-bearing rock formation may result in production losses or a reduced ability of the formation to accept injected fluids (for example, water or treatment fluids).

Completion fluids are utilised during operations that take place in the so-called completion phase of a wellbore (after drilling of the wellbore and before commencement of production of fluids from a rock formation into the wellbore or injection of fluids from the wellbore into a rock formation). Again, it is highly desirable that completion fluids minimize damage to the permeability of rock formations.

Servicing fluids may be utilized intermittently during the life of a wellbore, for example, when conducting workover, stimulation or remedial operations in a rock formation penetrated by the wellbore. For example, where the servicing fluid is a fracturing fluid, it is highly desirable mat leak-off of fluid from the fractures that are induced in the walls of the wellbore is minimized.

Drilling, completion or servicing fluids usually comprise a particulate solid bridging agent of a particle size that is large enough for bridging the pore throats of a porous and permeable rock formation and a filtration control additive (often termed a "fluid loss control additive"). The drilling, completion or servicing fluids deposit a layer of particles known as a "filter cake" on the walls of the wellbores. Where the wellbore penetrates a porous and permeable rock formation, this low-permeability filter cake prevents large amounts of fluids ("filtrate") from being lost from the drilling, completion or servicing fluid into the rock formation and also prevents solids from entering the pores of the formation. Fluid that is lost from a drilling, completion or servicing fluid into a porous and permeable rock formation is termed "filtrate". The filter cake is comprised of the particulate bridging agent and the fluid loss control agent and will also include other solids that are present in the wellbore fluid and are capable of depositing onto the walls of the wellbore. After the drilling, completion or servicing of the wellbore, it is advantageous that as much as possible of the filter cake is removed before commencing production of fluids from a porous and permeable rock formation into the wellbore or before fluid is injected into a porous and permeable rock formation from the wellbore. However, it is often difficult to access and remove substantial amounts of the filter cake.

In the event that a large volume of wellbore fluid is being lost through high conductivity conduits in the walls of a wellbore into a porous and permeable rock formation, a lost circulation fluid comprising a Lost Circulation Material (LCM) suspended in a base fluid is pumped into the wellbore. The high conductivity conduits are typically fissures, fractures or vugs in the walls of the wellbore (where a vug is a cavity, void or large pore in a rock formation). Lost circulation fluids frequently comprise coarser particulate solids (LCM) man the particulate bridging agents of drilling, servicing or completion fluids in order to bridge and seal the high conductivity conduits into which the wellbore fluid is being lost. Thus, a relatively low permeability plug comprising the particulate LCM and optionally other solids is deposited from the lost circulation fluid in the high conductivity conduits. These particulate plugs can be difficult to remove from the high conductivity conduits when it is desired to commence production of fluids from a rock formation into a production wellbore or injection of fluids into a rock formation from an injection wellbore.

Conventionally, filter cakes are removed from wellbore walls by contacting the filter cakes with one or more clean-up fluids. One common bridging agent for bridging the pore throats of a porous formation and for plugging any high conductivity conduits (e.g. fissures) therein is powdered calcium carbonate. The filter cake may be removed by using a clean-up fluid comprising enzymes and oxidizers to degrade the fluid loss control additive prior to contacting the filter cake with a strongly acidic clean-up solution for a sufficient period of time to dissolve the particulate calcium carbonate bridging agent. However, despite current anti-corrosion steps, the strongly acidic solution often corrodes metallic surfaces and completion equipment such as sand control screens causing early failure of such equipment. The acidic clean-up solution may also be incompatible with the producing formation and may cause formation damage. In addition, inefficient dissolution of filter cake occurs when an acidic clean-up solution reacts rapidly with a portion of the filter cake, opening up fluid communication between the clean-up fluid in the wellbore and the permeable formation, whereupon the clean-up fluid enters the formation without contacting the remaining filter cake. Another problem arises when an expandable sandscreen is placed in an open hole wellbore in the interval of the wellbore adjacent to a hydrocarbon-bearing formation. After placement of the sandscreen, it is expanded to fit the diameter of the wellbore thereby providing excellent support to the wellbore and exclusion of sand production. Unfortunately, this results in the filter cake becoming trapped between the expanded sandscreen and the formation so that it is very difficult to access the filter cake with a clean-up solution. Under such circumstances it would be advantageous if the filter cake were soluble in less-corrosive and less-damaging fluids, for example, naturally occurring wellbore fluids. In this way untreated or trapped filter cake should ultimately be reached by and become dissolved in the fluids.

Where the filter cake is deposited on and/or in the walls of a hydrocarbon production wellbore, the hydrocarbon-bearing formation will generally produce a significant proportion of water. Where the filter cake is deposited on and/or in the walls of a water injection well or a water producing well, the filter cake will again be exposed to large volumes of water over a long period of time. Where the filter cake is deposited on and/or in the walls of a geothermal wellbore, the filter cake will be exposed to hot water and steam. Accordingly, particulate solid bridging agents formed of a water-soluble salt for example, alkali metal halides) or a sparingly water-soluble salt (for example, magnesium borate and magnesium salts of carboxylic acids) have been utilized or proposed in drilling or servicing fluids. Thus, filter cakes containing the water-soluble or sparingly water-soluble bridging agent have been removed by contacting the filter cake with an aqueous salt solution which is undersaturated with respect to the water-soluble or sparingly water-soluble salt. These water-soluble or sparingly water-soluble bridging agents may be employed in either an oil-based treatment fluid or in an aqueous based treatment fluid provided that the aqueous base fluid is saturated with respect to the water-soluble or sparingly water-soluble salt. However, there remains a need for further wellbore fluids where the bridging agent is comprised of a sparingly water-soluble material.

Accordingly, the present invention relates to a wellbore fluid comprising a base fluid and a particulate bridging agent comprised of a sparingly water-soluble material selected from the group consisting of melamine(2,4,5-triamino-1,3,5-triazine), lithium carbonate, lithium phosphate ($Li_3PO_4$), and magnesium sulfite, preferably, melamine and lithium carbonate.

The term "wellbore fluid" as used herein encompasses drilling fluids, lost circulation fluids, completion fluids such as perforating pills and under-reaming fluids, and servicing fluids such as kill fluids, workover fluids, milling fluids, fracturing fluids, solvents, non-acidic aqueous dissolving agents, and fluids containing particulate diverting agents.

The wellbore fluid of the present invention is suitable for use in a variety of wellbores including oil and/or gas producing wellbores, water or gas injection wellbores, water producing wellbores and geothermal wellbores.

The sparingly water-soluble materials that have been selected for use as the particulate bridging agent have a solubility in water at a temperature of 25° C. of less than 7% by weight, preferably less than 2% by weight. In addition, these materials have a solubility in water at a temperature of 80° C. of less than 7% by weight, preferably less than 3.5% by weight.

Optionally, a fluid loss control additive is included in the wellbore fluid of the present invention.

The present invention also provides a method of forming a removable filter cake on the walls of a wellbore that penetrates a porous and permeable rock formation comprising the steps of:

(a) placing a wellbore fluid in the wellbore wherein the wellbore fluid comprises a base fluid and a particulate bridging agent comprised of a sparingly water-soluble material selected from the group consisting of melamine, lithium carbonate, lithium phosphate ($Li_3PO_4$), and magnesium sulfite, preferably, melamine and lithium carbonate; and (b) permitting the particulate bridging agent to deposit from the wellbore fluid onto and/or into the walls of the wellbore thereby forming the removable filter cake, whereby fluid loss to the formation through the filter cake is reduced.

Suitably, the particulate bridging agent may bridge the pore throats of the rock formations penetrated by the wellbore and/or may enter any cracks, fissures, fractures, or vugs in the wellbore wall.

Optionally, a fluid loss control additive is included in the wellbore fluid.

By "removable" is meant that the filter cake may be removed without pumping a specialised clean-up fluid into the wellbore. In other words, the filter cake may be self-removing.

The filter cake is permitted to build up on the walls of the wellbore owing to the pressure of the wellbore fluid in the wellbore being maintained at above the pore-pressure of the porous and permeable formation that is penetrated by the wellbore. Preferably, the differential pressure between the pressure of the wellbore fluid in the wellbore and the pore-pressure is at least 200 psi.

Where the wellbore is a hydrocarbon production wellbore, the bridging agent may be removed by putting the well into production owing to the water that is co-produced with the hydrocarbon dissolving the sparingly water-soluble material. Where the wellbore is a water production well or a geothermal well, the bridging agent may be removed by putting the well into production owing to the sparingly water-soluble material dissolving in the produced water. Where the wellbore is a water injection well, the filter cake may be removed by commencing water injection owing to the injected water dissolving the sparingly water-soluble material. Thus, both the produced water and injected water are undersaturated with respect to the sparingly water-soluble material. The bridging agent can be eventually completely solubilised in water or alternatively solubilised to the extent mat the particles are sufficiently reduced in size to permit their removal from the formation with the produced or injected water. The time required to solubilise the particles depends on a number of factors including, the temperature in the wellbore, the size and shape of the bridging agent particles, and the amount of water that the filter cake is exposed to. The filter cake is expected to subsist for less than 200 hours when a production well is put into production or when water is injected into an injection well.

Optionally, if rapid dissolution is required, a clean-up fluid may be pumped into the wellbore. The clean-up fluid may be an aqueous fluid that is under-saturated with respect to the bridging agent. Preferably, the clean-up fluid is an aqueous solution of an acid, preferably, an aqueous solution of a weak acid or a precursor of a weak acid. Preferably, the weak acid is selected from the group consisting of formic acid, citric acid, acetic acid, lactic acid, glycolic acid, succinic acid, and acidic sequestrants such as those based upon partially neutralised ethylenediaminetetracetic acid (EDTA). Preferably, the precursor of the weak acid is selected from materials mat are capable of hydrolysing to produce weak acids such as the polyglycolic or polylactic homopolyesters and orthoesters such as orthoformate esters. Preferably, the weak acid or acid precursor is present in the clean-up fluid in an amount of between 1% and 20% by weight. An advantage of using an aqueous solution of a weak acid or an aqueous solution of a precursor of a weak acid is that the clean-up fluid is less corrosive to metal surfaces and equipment than the strong acids that are used to dissolve conventional inorganic bridging agents such as calcium carbonate. A further advantage of the sparingly water-soluble materials employed in the present invention is that even partial reaction with an acid forms products having a higher solubility in water. Thus, lithium carbonate is converted to lithium bicarbonate, lithium phosphate ($Li_3PO_4$) is converted to lithium hydrogen phosphates, and magnesium sulfite is converted to magnesium bisulfite upon partial reaction with an acid. All of these products are of much higher solubility than their sparingly water-soluble precursors. In addition, the amine groups that are present in melamine will protonate under mildly acidic conditions, greatly increasing the water-solubility of the bridging agent.

Where the sparingly water-soluble particulate bridging agent is comprised of magnesium sulfite, the clean-up fluid may comprise an aqueous solution of an oxidizing agent that is capable of converting magnesium sulfite to water-soluble magnesium sulfate. Thus, magnesium sulfate has a much higher solubility in water than magnesium sulfite. Suitable oxidizing agents include hydrogen peroxide, persulfate salts, and per-acids such as peracetic acid. Preferably, the oxidizing agent is present in the clean-up fluid in an amount of 1 to 20% by weight. Optionally, the clean-up fluid also comprises a weak acid or a precursor of a weak acid.

Where the sparingly water-soluble particulate bridging agent is comprised of melamine, it is envisaged that the removable filter cake may be removed from the walls of a wellbore by placing an aqueous wash fluid downhole and leaving the aqueous wash fluid to soak in the interval of the wellbore where it is desired to remove the filter cake. The soak time should be sufficient for the aqueous wash fluid to heat up to a temperature of at least 60° C., preferably at least 75° C., for example, at least 90° C. Because the solubility of melamine increases relatively rapidly with increasing temperature, the particulate bridging agent is either completely dissolved in the aqueous wash fluid or is solubilised to the extent that the particles are sufficiently reduced in size to permit their removal from the formation. The aqueous wash fluid is heated to the desired temperature owing to transfer of geothermal heat from the formation. Typically, it may take at least several hours, for example, about 1 day for the aqueous wash fluid to be heated to the desired temperature. In general, the operator will be able to determine that a sufficient period of time has elapsed when the fluid loss rate from the wellbore to the formation increases.

The rate of dissolution of the bridging agents in water is also enhanced by the presence of carbon dioxide. Accordingly, the high partial pressures of carbon dioxide that are often present in fluids produced from hydrocarbon-bearing formations can be expected to accelerate dissolution of the bridging agent.

Optionally, a clean-up fluid is placed downhole and left to soak across the interval of the wellbore where it is desired to remove the filter cake for a sufficient period of time to either completely dissolve the bridging agent or to solubilise the bridging agent to the extent that the particles are sufficiently reduced in size to permit their removal from the formation. The clean-up fluid may contain enzymes or oxidising agents to degrade the fluid-loss control and viscosifying polymers that accumulate in the filter-cake, and may contain acids or acid precursors to speed the dissolution of the bridging solids. Preferably, the optional clean-up solution is left to soak for about 2 to 24 hours. In general, the operator will be able to determine that a sufficient period of time has elapsed when the fluid loss rate from the wellbore to the formation increases. Thereafter, a wash fluid (for example, an aqueous fluid such as water or seawater or a dilute brine) may be pumped at a high rate into the wellbore in order to create turbulent cleaning conditions thereby removing the remaining filter cake from the walls of the wellbore. Alternatively, the remaining filter cake may be removed by producing water from the formation or by injecting water into the formation.

Preferably, the wellbore fluid is selected from (a) a drilling fluid; (b) a fluid used to control lost circulation (termed "loss circulation fluid"); (c) a completion fluid used during completion operations; and (d) a well-servicing fluid used when conducting work-over, stimulation or remediation operations.

Thus, in a preferred embodiment of the present invention there is provided a method of drilling a wellbore through a porous and permeable rock formation using a drilling fluid comprising a base fluid, a fluid loss control additive, and a particulate bridging agent comprised of a sparingly water-soluble material selected from the group consisting of melamine, lithium carbonate, lithium phosphate ($Li_3PO_4$), and magnesium sulfite wherein the pressure of the drilling fluid in the wellbore is maintained at above the pressure in the porous and permeable rock formation such that a filter cake deposits on and/or in the walls of the wellbore and reduces fluid loss from the drilling fluid to the rock formation.

By being deposited "in the walls of the wellbore" is meant that filter cake may be deposited in any cracks, fractures, fissures or vugs that are present in the walls of the wellbore.

Suitably, the wellbore that is drilled using this preferred embodiment of the present invention is a hydrocarbon production wellbore (an oil or gas well), an injection wellbore (for example, a water or gas injection well), a water-producing wellbore or a geothermal wellbore.

In another preferred embodiment of the present invention there is provided a method of controlling loss of fluid from a wellbore into a porous and permeable rock formation through a high conductivity conduit that extends from the wellbore into the rock formation comprising the steps of:

(a) placing a lost circulation fluid in the wellbore wherein the lost circulation fluid comprises a slurry of particulate lost circulation material (LCM) in a base fluid wherein the LCM is suspended in the base fluid in an amount of at least 5 pounds per barrel, preferably at least 10 pounds per barrel, more preferably at least 20 pounds per barrel, and most preferably at least 30 pounds per barrel, and is comprised of a sparingly water-soluble material selected from the group consisting of melamine, lithium carbonate, lithium phosphate ($Li_3PO_4$), and magnesium sulfite; and (b) permitting the LCM to accumulate in, or at the entrance of, the high conductivity conduit thereby forming a removable low-permeability plug that bridges the conduit whereby fluid loss to the formation through the conduit is reduced.

By "removable" is meant that the plug may be removed without the assistance of a specifically designed clean-up fluid.

The slurry is pumped into the interval of the wellbore where a high conductivity conduit (for example a fissure) is present in the wall of the wellbore and through which fluid is being lost into the porous and permeable rock formation, for example, a hydrocarbon-bearing rock formation. Filtration of the slurry results in deposition of the particulate LCM in the high conductivity conduit such that the conduit becomes filled with a solid pack of LCM particles. Optionally, a fluid loss control agent may be present in the slurry thereby assisting in sealing the high conductivity conduit. Preferably the sealing of the conduit is made more complete when a subsequent wellbore fluid such as drilling fluid, in particular, a low fluid loss drilling fluid, forms an impermeable filter cake upon the plug of particulate LCM.

In yet another preferred embodiment of the present invention there is provided a method of controlling loss of fluid from a completion fluid into a porous and permeable rock formation penetrated by a wellbore by:

(a) placing a completion fluid in the wellbore wherein the completion fluid comprises a base fluid, a fluid loss control additive, and a particulate bridging agent comprised of a sparingly water-soluble material selected from the group consisting of melamine, lithium carbonate, lithium phosphate, and magnesium sulfite; and (b) maintaining the pressure of the completion fluid in the wellbore at above the pore-pressure of the rock formation such that a filter cake deposits on or in the walls of the wellbore.

Suitably, the completion fluid (and also the drilling fluid referred to above) additionally contains a polymeric viscosifier(s) such as xanthan gum, hydroxyethylcellulose, welan gum (for example, Biozan™; ex Kelco) or diutan gum (for example, Geovis XT™; ex Kelco). The completion fluid that is placed in the wellbore may fill the entire wellbore. Alternatively, the completion fluid may be employed as a pill of sufficient volume to fill the interval of the wellbore that is to be "completed" with the remainder of the wellbore being filled with a second fluid having an appropriate density for well control purposes. Thus, the density of the second fluid is chosen such that fluid does not flow from a rock formation into the wellbore. It is envisaged that the second fluid may be a brine that is substantially free of suspended solids.

It is also envisaged that the wellbore may be a cased wellbore that is perforated in an interval of the wellbore that lies across a porous and permeable rock formation, for example, a hydrocarbon-bearing rock formation. Accordingly, the filter cake will deposit from the completion fluid in the perforation tunnels formed in the cased wellbore thereby reducing fluid loss from the completion fluid to the formation.

In yet a further preferred embodiment of the present invention, there is provided a method of controlling loss of fluid from a workover fluid to an interval of a wellbore that lies across a porous and permeable rock formation wherein the method comprises the steps of:

(a) pumping a sufficient volume of a first workover fluid to fill the interval of the wellbore that lies across the porous and permeable rock formation wherein the first workover fluid comprises a base fluid, a fluid loss control additive, and a particulate bridging agent comprised of a sparingly water-soluble material selected from the group consisting of melamine, lithium carbonate, lithium phosphate, and magnesium sulfite such that a removable filter cake deposits from the first workover fluid in said interval of the wellbore onto the walls of the wellbore and into any cracks, fractures or fissures therein;

(b) pumping a second workover fluid into the wellbore wherein the second workover fluid is of sufficient density to at least counterbalance the pressure of the porous and permeable rock formation;

and wherein the filter cake deposited in step (a) reduces fluid loss from the workover fluids to the porous and permeable rock formation.

The second workover fluid may be of the same composition as the first workover fluid or may be of a different composition, for example a solids free brine or oil. In the case of aqueous workover fluids, it is preferred that the second workover fluid is substantially saturated with respect to the sparingly water-soluble material that comprises the particulate bridging agent of the first workover fluid. The first workover fluid is used to seal the formation to prevent fluid losses from the second workover fluid while the second workover fluid is used to perform functions such as maintaining well control (hydrostatic head), circulating debris such as "milled out" downhole equipment out of the wellbore (for example, "milled out" packers or screens), providing a low viscosity fluid to allow the easy running of tools in and out of the wellbore and acting as a "re-completion" fluid.

Where the wellbore is a cased wellbore that is perforated in the interval of the wellbore across a porous and permeable rock formation, the filter cake will deposit from the first workover fluid in the perforation tunnels in the casing of the wellbore thereby reducing fluid loss from the second workover fluid to the formation.

Wells that require a "workover" are often depleted hydrocarbon production wells where the hydrocarbon-bearing rock formation has a low pore pressure. Accordingly, the hydrostatic head of the second workover fluid in the interval of the wellbore across the hydrocarbon-bearing rock formation may be greatly in excess of the pore pressure in the depleted hydrocarbon-bearing rock formation even when the second workover fluid is a simple low-density fluid such as water (for example, seawater), or an oil. Accordingly, the ability to control fluid loss by the method described above is more important at high differential pressures (where the pressure of the second workover fluid in the wellbore is significantly higher than the pore pressure of the rock formation).

Fracturing fluids generally comprise a proppant (for example, sand particles or ceramic beads) suspended in an aqueous base fluid that is normally viscosified by a polymer or a viscoelastic surfactant such that the proppant that is used to prop open the fractures is efficiently transported into the fractures that are created when the fracturing fluid is pumped at high pressure into a porous and permeable rock formation. However, if the fracturing fluid leaks off too quickly into the formation the high pressure dissipates and the fractures cease to grow. Leak-off control is normally achieved by dispersing ground particles such as silica flour in the fracturing fluid to block/bridge the exposed pores in the fracture that are accepting the "leak-off". Unfortunately, materials like silica may cause at least some permanent plugging of the pores of the formation.

Accordingly, in yet another preferred embodiment of the present invention there is provided a method of fracturing a porous and permeable rock formation comprising: injecting a fracturing fluid into an interval of a wellbore across the rock formation that is to be fractured wherein the fracturing fluid comprises a base fluid, proppant, a viscosifer, and a particulate leak-off control agent comprised of a sparingly water-soluble material selected from the group consisting of melamine, lithium carbonate, lithium phosphate, and magnesium sulfite; and maintaining the pressure of the fracturing fluid in the interval of the wellbore across the rock formation at above the fracture pressure of the formation whereby proppant enters and props open the fractures that are formed in the wellbore wall and the particulate leak-off control agent seals exposed pore throats on the walls of the fracture.

An advantage of this preferred embodiment of the present invention is that the pressure of the fracturing fluid in the growing fracture is maintained for as long as possible at above the fracturing pressure of the rock formation by reducing leak-off of fluid to the formation and hence reducing pressure dissipation to the formation. Where the fractures are formed in a hydrocarbon-bearing rock formation penetrated by a production wellbore, the particulate bridging material will dissolve in co-produced water upon returning the wellbore to production thereby improving the flow of fluid from the hydrocarbon-bearing formation. Where the fractures are formed in a porous and permeable rock formation penetrated by a water injection well, the particulate bridging material will dissolve in water that is injected into the rock formation, thereby improving the flow of fluid from the injection well into the formation.

In another embodiment of the present invention, there is provided a method of diverting non-acidic treatment fluids away from high permeability rock formations or high conductivity conduits and into lower permeability and/or partially plugged rock formations or lower conductivity conduits using a treatment fluid comprising a non-acidic fluid and a particulate bridging agent comprised of a sparingly water-soluble material selected from the group consisting of melamine, lithium carbonate, lithium phosphate ($Li_3PO_4$), and magnesium sulfite. For example, where the non-acidic fluid is an aromatic solvent, the treatment fluid may be used to dissolve wax and/or asphaltene deposits that plug flow channels in oil wells (and hence reduce oil production). The method comprises pumping a suspension comprising the particulate bridging agent suspended in an aromatic solvent into a hydrocarbon production wellbore such that a filter cake forms on or in a high permeability rock formation or the particulate bridging agent enters and seals high conductivity conduits (or flow channels) in the walls of the wellbore thereby limiting the loss of aromatic solvent from the wellbore. Accordingly, the aromatic solvent is diverted towards low conductivity conduits (or flow channels) that may be damaged by asphaltene and/or wax deposits, thereby improving the dissolution of the deposits by the aromatic solvent.

Preferred features of the wellbore fluid of the present invention will now be described below.

The base fluid of the wellbore fluid may be water, an oil (for example, a mineral oil), a solvent (for example, an aromatic solvent), or a mixture thereof (for example, a water-in-oil emulsion). Generally, the base fluid is present in the wellbore fluid in an amount in the range of from about 30 to 99% by weight of the fluid, preferably, about 70 to 97% by weight.

Where the base fluid is water, it is preferred that the base fluid is an aqueous solution of a density increasing water-soluble salt. The density increasing water-soluble salt may be selected from the group consisting of alkali metal halides (for example, sodium chloride, sodium bromide, potassium chloride and potassium bromide) alkali metal carboxylates (for example, sodium formate; potassium formate, caesium formate, sodium acetate, potassium acetate or caesium acetate), sodium carbonate, potassium carbonate, alkaline earth metal halides (for example, calcium chloride and calcium bromide), and zinc halide salts.

Alternatively, density control may be provided to the water-based wellbore fluid using insoluble weighting agents. Suitable weighting agents include suspended mineral particles such as ground barites, iron oxides; (for example, haematite), ilmenite, calcite, magnesite ($MgCO_3$), dolomite, olivine, siderite hausmannite or suspended metal particles.

Where the base fluid is an oil, it is preferred that the oil is selected from the group consisting of mineral oils, synthetic oils, esters, kerosene, and diesel.

The base fluid may also be a water-in-Oil emulsion comprising droplets of an aqueous phase dispersed in a continuous oil phase. Suitably, the aqueous phase of the emulsion comprises an aqueous solution of a density increasing water-soluble salt thereby increasing the density of the wellbore fluid. Suitable density-increasing water-soluble salts are listed above. Preferably, the concentration of salt in the dispersed droplets of aqueous phase is adjusted to provide a Water Activity similar to that of the underground formation being contacted by the wellbore fluid. The continuous oil phase may be any oil in which an aqueous solution of salts can be emulsified. Suitable oils are listed above. An advantage of a water-in-oil emulsion is that this enhances both filtration control (owing to the emulsion droplets blocking the flow of fluid through the filter cake) and the viscous properties of the fluid. The term oil-based wellbore fluid as used herein encompasses wellbore fluids where the base fluid is a water-in-oil emulsion.

Density control may also be provided to the oil-based wellbore fluid using weighting agents. Suitable weighting agents are as listed above for aqueous-based wellbore fluids.

Where the base fluid is water, the particulate bridging agent comprised of a sparingly water-soluble material selected from the group consisting of melamine, lithium carbonate, lithium phosphate, and magnesium sulfite (hereinafter "sparingly water-soluble particulate bridging agent") is dosed into the wellbore fluid at a concentration that is significantly higher than its solubility in water at the temperature encountered downhole thereby ensuring at least a portion of the bridging solids remain suspended in the wellbore fluid. Alternatively, the sparingly water-soluble particulate bridging agent may be protected with a hydrophobic coating that is capable of dissolving in a produced liquid hydrocarbon, for example, a produced oil or produced gas condensate. However, such coated particulate bridging agents should not be employed when drilling or completing water injection wells or gas wells that are, free of gas condensate.

Generally the sparingly water-soluble particulate bridging agent is present in the wellbore fluid in an amount sufficient to create an efficient filter cake that provides the desired level of fluid loss control. Typically, the sparingly water-soluble particulate bridging agent is present in the wellbore fluid in an amount in the range of 1 to 70% by weight, preferably 2 to 50% by weight, more preferably, 3 to 30% by weight, in particular 3 to 15% by weight. High doses are preferred for lost circulation fluids, for example 10 to 60% by weight.

The desired particle size distribution of the sparingly water-soluble particulate bridging material is determined by the size of any fractures and the like into which the wellbore fluid is being lost or by the pore throat size of the formation that is to be drilled or treated. Typically, for use as a Lost Circulation material the sparingly water-soluble particulate bridging agent has a particle size distribution in the range of from about 50 microns to about 10 mm, preferably 50 microns to about 2 mm. For use as a bridging solid in a drilling, servicing or completion fluid the sparingly water-soluble particulate bridging agent has a particle size distribution in the range of from about 0.1 micron to 600 microns, preferably 0.1 to 200 microns, and more preferably 0.1 to 100 microns. Preferably, the sparingly water-soluble particulate bridging material has a broad polydisperse size distribution. The materials (lithium carbonate, lithium phosphate, magnesium sulfite and melamine) are available as crystalline materials of the desired size or as crystals or granules that can be ground to the desired size. The sparingly water-soluble particulate bridging material may be in the form of substantially spherical particles or may be of an irregular shape.

More than one sparingly water-soluble particulate bridging agent may be employed in the wellbore fluid.

The wellbore fluids may additionally comprise one or more of the following materials: a conventional particulate bridging or weighting agent, for example barite; acid-soluble materials such as calcium carbonate; water-soluble materials such as alkali metal halides; and, other sparingly water-soluble materials such as magnesium borate and magnesium salts of carboxylic acids. These conventional particulate bridging agents may be employed in either an oil-based wellbore fluid or in an aqueous based wellbore fluid. Where the conventional particulate bridging agent is comprised of a water-soluble or sparingly water-soluble material, it is employed in an aqueous based fluid in amounts above the saturation concentration of the water-soluble or sparingly water-soluble material in water at the conditions encountered downhole so as to provided suspended particles of the conventional particulate bridging agent. Water based wellbore fluids may additionally comprise particulate solid bridging agents comprised of oil-soluble materials such as resins. Suitable resins include thermoplastic resins derived from the polymerization of hydrocarbons, having an amorphous or crystalline structure which allows it to be crushed and ground at room temperature while retaining its strength so that it remains non-deformable when subjected to pressure in the pores and fissures of a rock formation. These resins have a melting point above the temperature encountered downhole and are insoluble in aqueous based treatment fluids but are soluble in produced crude, oils and gas condensates. Examples of preferred resins include coumarone-indene resins, and alkylated aromatic resins.

Preferably, the sparingly water-soluble particulate bridging agent employed in the present invention comprises a significant portion of the suspended solids contained in the wellbore fluid and hence in the filter cake. Suitably, the sparingly water-soluble particulate bridging agent comprises at least 15% by volume, preferably at least 30% by volume, more preferably at least 60% by volume of the suspended solids of the wellbore fluid (the remainder being conventional particulate bridging agents, weighting agents, drilled solids, and clays). Without wishing to be bound by any theory it is believe that dissolution of the sparingly water-soluble particulate bridging agent creates voids in the filter cake thereby rendering it permeable. Where the filter cake is formed in a production well, the filter cake is readily degraded when the well is put into production owing to produced fluids flowing more freely through the permeable filter cake. Accordingly, other solids that are deposited in the filter cake become entrained in the produced fluid such that the filter cake is removed from the wellbore wall.

Where the wellbore fluid is an aqueous based fluid, the wellbore fluid may comprise additional additives for improving the performance of the wellbore fluid with respect to one or more properties. Examples of additives that may be added to aqueous based wellbore fluids include viscosifiers, weighting agents, density increasing water-soluble salts, fluid loss control agents (also known as filtration control additives), pH control agents, clay or shale hydration inhibitors (such as polyalkylene glycols), bactericides, surfactants, solid and liquid lubricants, gas-hydrate inhibitors, corrosion inhibitors, defoamers, scale inhibitors, emulsified hydrophobic liquids such as oils, acid gas-scavengers (such as hydrogen sulfide scavengers), thinners (such as lignosulfonates), demulsifiers and surfactants designed to assist the clean-up of invaded fluid from producing formations.

Water-soluble polymers may be added to an aqueous based wellbore fluid to impart viscous properties, solids-dispersion and filtration control to the fluid. A wide range of water-soluble polymers may be used for an aqueous based wellbore fluid including cellulose derivatives such as carboxymethyl cellulose, hydroxyethylcellulose, carboxymethylhydroxyethyl cellulose, sulphoethylcellulose; starch derivatives (which may be cross-linked) including carboxymethyl starch, hydroxyethylstarch, hydroxypropyl starch; bacterial gums including xanthan, welan, diutan, succinoglycan, scleroglucan, dextran, pullulan; plant derived gums such as guar and locust-bean gums and their derivatives; synthetic polymers and copolymers derived from any suitable monomers including acrylic acid or methacrylic acid and their hydroxylic esters (for example, hydroxyethylmethacrylic acid), maleic anhydride or acid, sulphonated monomers such as styrenesulphonic acid and AMPS, acrylamide and substituted acrylamides, N-vinylformamide and N-vinylacetamide, N-vinylpyrrolidone, vinyl acetate, N-vinylpyridine and other cationic vinylic monomers (for example, diallyldimethylammonium chloride, DADMAC); and any other water-soluble or water-swellable polymers known to those skilled in the art. Generally, viscosifying water-soluble polymers are present in the wellbore fluid of the present invention in an amount sufficient to maintain the bridging and weighting solids in suspension and provide efficient clean out from the well of debris such as drilled cuttings. The viscosifying polymer may be present in the wellbore fluid in an amount in the range of 0.2 to 5 pounds of viscosifier per barrel of wellbore fluid, preferably 0.5 to 3 pounds per barrel of wellbore fluid.

Rheological control (for example, gelling properties) can also be provided to the aqueous based wellbore fluid by adding clays and/or other inorganic fine particles. Examples include bentonite, montmorillonite, hectorite, attapulgite, sepiolite, Laponite™ (ex Laporte) and mixed metal hydroxides.

A fluid loss control additive may be used to fill the voids between the particulate bridging agent. Besides the water-soluble polymers listed above, examples of fluid loss control additives for water-based wellbore fluids include causticised lignite, modified lignites, cross-linked lignosulphonates and the like. Thus, these fluid loss control additives are dissolved macromolecules that are capable of adsorbing onto the bridging solids or are macromolecules that are in colloidal dispersion in the aqueous base fluid, for example, a hydrated polymer that adopts a coiled conformation when dispersed in the aqueous base fluid rendering the hydrated polymer capable of plugging micro- or nano-sized pores in the filter cake.

Suitable pH control agents for aqueous based wellbore fluids include calcium hydroxide, magnesium hydroxide, magnesium oxide, potassium hydroxide, sodium hydroxide and the like.

Where the wellbore fluid is an oil based fluid, the wellbore fluid may comprise additional additives for improving the performance of the wellbore fluid with respect to one or more properties. Examples of additives that may be added to oil-based wellbore fluids include viscosifiers, surfactants (for forming stable water-in-oil emulsions and to oil-wet the surface of mineral weighting agents), fluid loss control additives (also known as filtration control additives), lubricants (solid and liquid), and acid gas scavengers (for example, hydrogen sulfide scavengers).

A viscosifier may be added to the oil-based wellbore fluid to impart viscous properties, solids suspension and hole cleaning properties to the fluid. Normally the viscosifier is a montmorillonite or hectorite clay that has been treated with fatty quaternary ammonium salts to render the clay dispersible and exfoliatable in the oil-based wellbore fluid. Oil-soluble polymers and oligomers may be used as rheological modifiers.

Surfactants that may be added to the oil-based fluid to form stable water-in-oil emulsions and to oil-wet the surface of mineral weighting agents include fatty acids such as Tall Oil Fatty Acid (TOFA) and condensation products of TOFA with polyalkylene amines such as triethylenetetramine. The resulting fatty amidoamine and imidazoline products may be used as is or they may be further reacted with, for example, maleic anhydride to improve their performance. Where the surfactant contains a carboxylic acid functional group, such groups are generally converted to the corresponding calcium salt by addition of lime.

Suitable fluid loss control additives mat may be added to the oil-based wellbore fluid include asphalt, blown asphalt, sulphonated asphalt, gilsonite, fatty amine-modified lignite, and synthetic oil-soluble/swellable polymers.

The present invention will now be illustrated with respect to the following examples Solubility Tests The following tests show the solubility in water and in aqueous acidic solutions of the sparingly water-soluble materials.

EXAMPLE 1

Solubility of Melamine

The solubility of Melamine in water over a range of temperatures is given below in Table 1. The person skilled in the art would understand that a sufficient quantity of water is all that is required to dissolve particulate melamine deposited in a well, especially if the well is allowed to warm up towards its natural (prevailing) temperature after the cooling experienced during drilling of a wellbore or during injection of cold water from the surface. Accordingly, particulate melamine may automatically clean up (dissolve) in water that may be produced from a well along with hydrocarbons, or in water that is pumped into an injection well to maintain reservoir pressure.

TABLE 1

| Temperature (° C.) | Solubility of Melamine (% by weight) |
|---|---|
| 20 | 0.3 |
| 35 | 0.6 |
| 50 | 1.05 |
| 60 | 1.5 |
| 80 | 3.0 |
| 100 | 5 |
| 120 | 8 |

Melamine is also readily soluble in warm or hot acids such as acetic acid and hydrochloric acid. Thus, a mixture of melamine (25.2 g, 0.2M), 250 ml of water and 24 g acetic acid (0.4M) gives a clear solution when heated to a temperature of 80° C. Similarly a mixture of melamine (126 g, 1 M) and 1985 ml of 1.0075M hydrochloric acid produces a clear solution when heated to a temperature of 83° C.

The solubility of melamine in aqueous acidic solutions is advantageous where stimulation of the well by acid injection is contemplated, or where large amounts of particulate melamine are placed in the well, for instance as lost circulation material plugs in fractured formations.

EXAMPLE 2

Solubility of Lithium Carbonate

The solubility of lithium carbonate in water over a range of temperatures is given below in Table 2. As for Example 1, the person skilled in the art would understand that a sufficient quantity of water is all that is required to dissolve lithium carbonate particles that are deposited in a well. As before, this could be produced water or water pumped into an injection well, or an aqueous fluid placed into the well for the purpose of dissolving the lithium carbonate particles. The reduction in solubility with increasing temperature is an advantage where particulate lithium carbonate is used in higher temperature wells (for example wells having a bottom hole temperature (BHT) of 100° C. or more) in that premature dissolution of the solid particles is more easily avoided.

TABLE 2

| Temperature (° C.) | Solubility of Lithium Carbonate (g per 100 g of water) |
|---|---|
| 20 | 1.33 |
| 40 | 1.17 |
| 60 | 1.01 |
| 80 | 0.85 |
| 100 | 0.72 |

Lithium carbonate also rapidly dissolves in acids. For instance, acetic acid reacts with lithium carbonate to generate lithium acetate which is very soluble in aqueous solutions while hydrochloric acid reacts with lithium carbonate to generate the highly soluble lithium chloride salt. The ability to remove particulate lithium carbonate by pumping an acid into a well is an advantage where large amounts of particulate lithium carbonate are placed in the well, for instance as lost circulation material plugs in fractured formations.

Lithium carbonate also shows an enhanced solubility in water in the presence of carbon dioxide, which is frequently found in fluids produced from oil-wells or gas-wells (owing to the formation of lithium bicarbonate, $LiHCO_3$). For instance, at a temperature of 60° C. and at a pressure of 50 atmospheres of $CO_2$, 100 g of saturated solution contains 9.61 g of $LiHCO_3$.

The high solubility of $LiHCO_3$ is particularly advantageous in gas wells since the gas in the formation is almost inevitably saturated with water vapour and generally contains high concentrations of $CO_2$. As gas flows through the gas-bearing formation towards a producing gas well, the pressure reduces causing adiabatic cooling and condensation of water. The condensed water together with the high concentration of $CO_2$ will therefore dissolve particulate lithium carbonate residues without any need to pump dissolving fluids from the surface.

EXAMPLE 3

Solubility of Magnesium Sulfite

The solubility of magnesium sulfate in water over a range of temperatures is given below in Table 3. As for Examples 1 and 2, a sufficient quantity of water is all that is required to dissolve particulate magnesium sulfite deposited in a well. Thus, the particulate magnesium sulfite residues may automatically clean up (dissolve) in the water that may be produced along with hydrocarbons, or in the water that is pumped into an injection well to maintain reservoir pressure. Alternatively water or aqueous mixtures may be pumped into the well to dissolve the particulate magnesium sulfite residues.

TABLE 3

| Temperature (° C.) | Solubility of Magnesium Sulfite (% by weight) |
|---|---|
| 25 | 0.65 |
| 42 | 0.94 |
| 50 | 0.84 |
| 85 | 0.62 |
| 98 | 0.61 |

Magnesium sulfite is also readily dissolved in aqueous solutions of acids such as acetic or hydrochloric acid to produce sulphur dioxide and the very soluble magnesium acetate or magnesium chloride respectively. Even partial acidification to magnesium bisulfite is effective in dissolving particulate magnesium sulfite in that magnesium bisulfite is very water-soluble. For example, magnesium bisulfite is available commercially as a 30% by weight aqueous solution from Sigma Aldrich.

Alternatively oxidising agents such as hydrogen peroxide will cause the dissolution of magnesium sulfite by converting it to the soluble magnesium sulfate (62.9 g of magnesium sulfate dissolves in 100 g of water at a temperature of 20° C.).

EXAMPLE 4

Solubility of Lithium Phosphate

Lithium phosphate ($Li_3PO_4$) has a relatively low solubility in water (0.038 g per 100 g water at a temperature of 20° C.). It is therefore less preferred for applications where water (produced water, injection water, or aqueous clean-up fluid) is used to dissolve the particulate residues.

However mild acidification with, for example, acetic acid or hydrochloric acid increases the solubility greatly. For instance, $LiH_2PO_4$ is very soluble in water at 55% by weight.

EXAMPLE 5

Water-Based Wellbore Fluid Formulations

The following tests relate to water-based wellbore fluid formulations.

Fluid Formulations 1-4 (see Table 4 below) are suitable for use as drilling fluids, completion fluids such as a perforating pill or an under-reaming fluid, or workover fluids such as a kill fluid. Fluid Formulation 4 represents a typical prior art wellbore fluid that is currently used in the industry as, for example, a reservoir drilling fluid. This prior art fluid contains water-insoluble calcium carbonate bridging solids and is included for comparative purposes. The properties of Fluid Formulations 1-4 are given in Table 5 below.

Materials:

Powdered melamine, lithium carbonate, lithium phosphate and potassium chloride were all as supplied by Aldrich UK (laboratory chemical supplier). DuoVis™ (xanthan gum viscosifier), DualFlo™ (starch derivative Fluid loss Reducer) and Starcarb™ (calcium carbonate powder) were supplied by M-I Swaco llc.

The Fluid Formulations were tested in accordance with ISO 10416: 2002 (API RP 13I 7th edition). The Fluid Loss results are also presented in Table 5 below.

TABLE 4

| Fluid Formulations | | | | |
|---|---|---|---|---|
| Component (g) | Fluid 1 | Fluid 2 | Fluid 3 | Fluid 4 |
| Deionised water | 330 | 330 | 330 | 330 |
| DuoVis | 1.0 | 1.0 | 1.0 | 1.0 |
| DualFlo | 4.0 | 4.0 | 4.0 | 4.0 |
| Potassium Chloride | 10 | 10 | 10 | 10 |
| Melamine | 16 | — | — | — |
| Lithium carbonate | — | 20 | — | — |
| Lithium phosphate | — | — | 16 | — |
| Starcarb | — | — | — | 25 |
| Caustic soda | To pH 10.0 | None (pH 11.0) | To pH 10.0 | To pH 10.0 |

The varying gravimetric dose of the powders is to provide approximately the same loading by volume as the comparative Starcarb fluid (Fluid 4).

TABLE 5

| Properties of the Fluid Formulations | | | | |
|---|---|---|---|---|
| PROPERTIES | Fluid 1 | Fluid 2 | Fluid 3 | Fluid 4 |
| Plastic Viscosity cP | 12 | 12 | 12 | 13 |
| Yield Point lb/100 ft$^2$ | 16 | 17 | 17 | 17 |
| Gels(10 sec/10 min) | 6/7 | 7/8 | 7/8 | 8/9 |
| API Fluid Loss (mls) (determined according to ISO 10416) | 6.8 | 6.5 | 9.8 | 6.4 |

After the API Fluid Loss test, the excess wellbore fluid was decanted from the cell employed in the test and was replaced with deionised water. The cell was reseated, pressurised to 100 psi with nitrogen, and the permeation rate through the filter cake was measured for 30 minutes.

A similar test was performed by repeating the API Fluid Loss test to provide new filter cakes from Fluids 2 and 4, followed by permeating deionised water that was pressurised with carbon dioxide to 100 psi.

A similar test was performed by repeating the API Fluid Loss test to provide a filter cake with Fluids 1 to 4, followed by permeating 5% Acetic acid for 30 minutes, or until the liquid in the cell was all passed through the filter cake.

The results of these additional tests are given in Table 6 below, which shows average permeation rates (mls/min).

TABLE 6

| Fluid Loss Test Results | | | | |
|---|---|---|---|---|
| Permeant fluid | Fluid 1 (melamine) | Fluid 2 (lithium carbonate) | Fluid 3 (lithium phosphate) | Fluid 4 (calcium carbonate) |
| Deionised water | 7.4 | 0.52 | 0.32 | 0.18 |
| Deionised water + 100 psi $CO_2$ top pressure | — | 1.8 | — | 0.37 |
| 5% acetic acid | 10.6 | 24.0 | 9.0 | 1.56 |

The rate of flow of deionised water through the lithium phosphate and lithium carbonate-containing filter cakes is clearly improved compared to the benchmark calcium carbonate-containing filter cake (Fluid 4). The rates are still quite slow because the Duovis and DualFlo polymers concentrated in the filter cake reduce the flow rate and hence the dissolution of the sparingly water-soluble particles during the short (30 minutes) duration of the test.

The melamine-containing filter cake rapidly developed a much higher permeability to deionised water.

The presence of carbon dioxide increased the flow rate of water through the lithium carbonate containing filter cake more than three-fold.

The sparingly water-soluble solids of the present invention react to 5% acetic acid much more rapidly than particulate calcium carbonate (the industry norm).

EXAMPLE 6

Lost-Circulation Material and Water-Based Lost-Circulation Control Fluid

A base screen was removed from an API Fluid Loss cell and a bed of about one inch of 20-30 mesh sand was placed in the cell. This sand bed represents an extremely high permeability rock formation. Water was then poured through the bed to water-wet the sand.

A simple drilling fluid was mixed according to the following formulation:

| | |
|---|---|
| Deionised water | 330 g |
| Duovis ™ | 1.5 g |
| DualFlo ™ | 3.5 g |
| Barite | 63 g |

A portion of this drilling fluid was gently poured on top of the sand bed. On pressurising the cell to a pressure of 50 psi, the complete drilling fluid immediately flowed through the sand bed in less than 3 seconds. This represents a lost circulation problem such as may be encountered in the field.

A slurry was obtained by mixing 100 g of melamine (ex Aldrich) in 290 g of water, and 100 mls of the slurry was poured into the cell. On pressurising to 50 psi the aqueous phase of the slurry immediately filtered through the sand bed. On opening the cell a white filter cake layer of melamine particles was observed on top of the sand bed. A portion of the "simple" drilling fluid was poured into the cell which was re-pressurised to 50 psi. A much slower stream of drilling fluid passed through the sand bed, but all (about 100 mls) was still lost from the cell over a period of about 30 seconds. On opening the cell it was observed that the drilling fluid had all flowed through a small discontinuity in the bed of melamine particles.

Melamine particles were then added to the remaining drilling fluid at a dose of approximately 12.5 lbs/bbl. On placing this fluid into the cell and re-pressurising to 50 psi, the drilling fluid started to flow through the sand pack but slowed to a virtual stop in about 5-10 seconds. The pressure was increased to 100 psi. The effluent rate from the cell was then stabilised at a normal, slow filtration rate.

This Experiment illustrates the use of sparingly water-soluble solid particles as Lost Circulation Material, either in a specially designed fluid pumped into place in a wellbore to control fluid losses, or as an additive to a wellbore fluid such as a drilling fluid. The addition of the sparingly water-soluble material to drilling fluids may used be to stop fluid losses, but it may also be used pre-emptively to avoid the occurrence of such losses.

The particle size of the melamine obtained from Aldrich was measured by dry screening using a vibratory screen shaker. Results in weight percent are as follows:

| | | |
|---|---|---|
| >500 | microns | 0.22% |
| <500 > 300 | microns | 1.60% |
| <300 > 150 | microns | 74.0% |
| <150 | microns | 24.2% |

Such sized particles are well-suited to bridging the pores in extreme permeability sand formations, and also for accumulating in fractures of width less than about 1 mm by rapid filtration of a high-solids slurry of the particles which is flowing into the fracture.

EXAMPLE 7

Oil-Based Drilling Fluid Containing Melamine Particles, and Treatment of the Filter Cake Therefrom to Establish the Flow-Through of Seawater An oil-based drilling fluid was prepared, based upon the FazePro™ product of M-I Swaco LLC (see Table 7 below). The invert emulsion of this oil-based drilling fluid is designed to de-stabilise upon the application of an acid thereby enabling improved clean-up compared to conventional oil-based drilling fluids. The addition of melamine powder provides bridging and filter cake material to seal the sand-face of permeable formations. After drilling, the filter cake may be treated with an acid solution to disrupt the emulsion within the filter cake in order to increase the cake permeability. The acid also starts to dissolve some of the particulate melamine. In the case of a seawater injection well, the acid can be followed by injection of seawater which continues to dissolve the remaining melamine until the residues are completely removed.

This Example shows that an oil-based drilling fluid with suitable properties for drilling purposes can be formulated with melamine bridging solids. Subsequently the filter cake is treated with an acid solution followed by the flow of injected seawater, both of which fluids are active in removing the seal that was provided by the filter cake.

The oil-based drilling formulation was mixed using a Silverson L4RT Mixer fitted with a high shear head. The mixing times per component are shown in Table 7 below. The mixer speed was at about 6000 RPM. The temperature was monitored throughout and maintained at 150° F. or less by the use of a cooling water bath.

TABLE 7

| Product | Concentration (ppb) | Order | Time |
|---|---|---|---|
| DF-1 BASE OIL ™ (a) | 134.5 | 1= | |
| FAZEMUL ™ (b) | 12.0 | 1= | 5 mins |
| FAZEWET ™ (b) | 6.0 | 1= | |
| TRUVIS ™ (b) | 1.0 | 4 | 2 mins |
| Lime | 4.0 | 5 | 2 mins |
| ECOTROL RD ™ (b) | 0.5 | 6 | 16 mins |
| 1.35 ppg CaBr2 Brine | 164.9 | 7 | 20 mins |
| Melamine powder | 30 | 8 | 15 mins |

(a) ex TotalFinaElf UK Limited
(b) ex Trademark M-I Swaco llc

After mixing, the oil-based drilling fluid was hot rolled at a temperature of 150° F. for 16 hours to simulate heating downhole in the field. The viscous properties and the High Temperature/High Pressure Fluid Loss (HTHP FL) were then measured and are given in Table 8 below.

TABLE 8

| Rheological Properties at 120° F./48.8° C. | |
| --- | --- |
| Plastic Viscosity (cP) | 15 |
| Yield Point (lb/100 ft²) | 14 |
| 10 sec gel (lb/100 ft²) | 7 |
| 10 min gel (lb/100 ft²) | 7 |
| HTHP Fluid Loss (mls) At 200° F. and 500 psi | 3.1 |

The results presented in Table 8 show that satisfactory rheological and filtration performance was obtained.

After the HTHP Fluid loss test the excess drilling fluid was drained from the cell and replaced by a solution of 5% glacial acetic acid in kerosene. The cell was closed and heated to a temperature of 45° C. The acid solution was then pressurised to 100 psi so that the solution permeated through the filter cake, the flow-through weight being measured vs. time, as recorded below in Table 9.

TABLE 9

| Permeation of Acid Solution through Filter cake | |
| --- | --- |
| Time (minutes) | Permeated acid solution (grams) |
| 1 | 7.604 |
| 5 | 15.878 |
| 10 | 25.14 |
| 15 | 39.548 |
| 15 minutes 45 seconds | Gas breakthrough |

The cell was then refilled with seawater and heated to a temperature of 45° C. On pressurising to 100 psi, the seawater rapidly passed through the filter cake (66.5 g in 17 seconds). Examination of the filter cake showed that irregular areas had been etched away leaving some white melamine residues. The filter cake residues on the filter paper were placed in 500 mls of seawater and held at a temperature of 45° C. for 72 hours. After this time no visible melamine particles remained.

This is very advantageous for seawater injection wells where seawater injection is usually continued for years, leaving little chance that any residual melamine filter cake remains undissolved. Thus the injectivity of the seawater is maximised.

The invention claimed is:

1. A wellbore fluid comprising a base fluid and a particulate bridging agent comprised of a sparingly water-soluble material which is melamine.

2. A wellbore fluid as claimed in claim 1 wherein the base fluid is present in the wellbore fluid in an amount in the range of from about 30 to 99% by weight of the fluid.

3. A wellbore fluid as claimed in claim 1 wherein the sparingly water-soluble particulate bridging agent is present in the wellbore fluid in an amount in the range of 1 to 70% by weight.

4. A wellbore fluid as claimed in claim 1 wherein the wellbore fluid is a drilling, servicing or completion fluid and the sparingly water-soluble particulate bridging agent has a particle size distribution in the range of from about 0.1 micron to 600 microns.

5. A wellbore fluid as claimed in claim 1 wherein the wellbore fluid is an aqueous based fluid and the wellbore fluid comprises at least one additional additive selected from the group consisting of viscosifiers, weighting agents, density increasing water-soluble salts, filtration or fluid loss control agents, pH control agents, clay or shale hydration inhibitors, bactericides, surfactants, solid and liquid lubricants, gas-hydrate inhibitors, corrosion inhibitors, defoamers, scale inhibitors, emulsified hydrophobic liquids such as oils, acid gas-scavengers, and demulsifiers.

6. A wellbore fluid as claimed in claim 5 wherein the aqueous based wellbore fluid comprises a fluid loss control agent selected from the group consisting of water-soluble polymers, lignites, modified lignites, and cross-linked lignosulphonates.

7. A wellbore fluid as claimed in claim 1 wherein the wellbore fluid is an oil based fluid comprising at least one additional additive selected from the group consisting of viscosifiers, surfactants, fluid loss control additives, solid and liquid lubricants, and acid gas scavengers.

8. A wellbore fluid as claimed in claim 1 wherein the acid gas-scavengers are hydrogen sulfide scavengers and the thinners are lignosulfonates.

9. A method of forming a removable filter cake on the walls of a wellbore that penetrates a porous and permeable rock formation comprising the steps of:
    (a) placing a wellbore fluid in the wellbore wherein the wellbore fluid comprises a base fluid and a particulate bridging agent comprised of melamine; and
    (b) permitting the particulate bridging agent to deposit from the wellbore fluid onto and/or into the walls of the wellbore thereby forming the filter cake, whereby fluid loss to the formation through the removable filter cake is reduced.

10. A method as claimed in claim 9 wherein a fluid loss control additive is included in the wellbore fluid.

11. A method as claimed in claim 9 wherein the sparingly water-soluble particulate bridging agent is removed by putting the well into production.

12. A method as claimed in claim 9 wherein the sparingly water-soluble particulate bridging agent is removed from the wellbore of an injection well by dissolution in water that is injected into the injection well.

13. A method as claimed in claim 9 wherein the sparingly water-soluble particulate bridging agent is removed by (a) placing a clean-up fluid downhole and (b) leaving the clean-up fluid to soak across the interval of the wellbore where it is desired to remove the filter cake for a sufficient period of time to either completely dissolve the bridging agent or to solubilise the bridging agent to the extent that the particles are sufficiently reduced in size to permit their removal from the formation.

14. A method as claimed in claim 13 wherein the clean-up fluid is an aqueous fluid that is under-saturated with respect to the bridging agent or is an aqueous solution of an acid or a precursor of a weak acid.

15. A method as claimed in claim 13 wherein the removable filter cake is removed from the walls of a wellbore by placing an aqueous wash fluid downhole and leaving the wash fluid to soak in the interval of the wellbore where it is desired to remove the filter cake for a sufficient period of time for the wash fluid to heat up to a temperature of at least 60° C. and leaving the heated wash fluid soaking in the interval until either the particulate bridging agent is completely dissolved in the wash fluid or is solubilised to the extent that the particles are sufficiently reduced in size to permit their removal from the formation.

16. A method of drilling a wellbore through a porous and permeable rock formation using a drilling fluid comprising a base fluid, a fluid loss control additive, and a particulate bridging agent comprised of melamine, wherein the pressure of the drilling fluid in the wellbore is maintained at above the pressure in the porous and permeable rock formation such that a filter cake deposits on and/or in the walls of the wellbore and reduces fluid loss from the drilling fluid to the rock formation.

17. A drilling method as claimed in claim 16 wherein the sparingly water-soluble particulate bridging agent of the drilling fluid has a particle size distribution in the range of from about 0.1 micron to 600 microns.

* * * * *